US012673906B2

(12) United States Patent
Suzuki et al.

(10) Patent No.: US 12,673,906 B2
(45) Date of Patent: Jul. 7, 2026

(54) METHOD FOR PRODUCING RADIOACTIVE LABELED SUBSTANCE, DEVICE FOR PRODUCING RADIOACTIVE LABELED SUBSTANCE, AND METHOD FOR EVAPORATIVELY CONCENTRATING RADIOACTIVE METAL NUCLIDE

(71) Applicant: NATIONAL INSTITUTES FOR QUANTUM SCIENCE AND TECHNOLOGY, Chiba (JP)

(72) Inventors: Hisashi Suzuki, Chiba (JP); Yukie Yoshii, Chiba (JP)

(73) Assignee: NATIONAL INSTITUTES FOR QUANTUM SCIENCE AND TECHNOLOGY, Chiba (JP)

( * ) Notice: Subject to any disclaimer, the term of this patent is extended or adjusted under 35 U.S.C. 154(b) by 573 days.

(21) Appl. No.: 18/025,090

(22) PCT Filed: Jul. 8, 2021

(86) PCT No.: PCT/JP2021/025827
§ 371 (c)(1),
(2) Date: Mar. 7, 2023

(87) PCT Pub. No.: WO2022/064812
PCT Pub. Date: Mar. 31, 2022

(65) Prior Publication Data
US 2023/0357100 A1      Nov. 9, 2023

(30) Foreign Application Priority Data
Sep. 28, 2020      (JP) ................................. 2020-162407

(51) Int. Cl.
C07B 59/00      (2006.01)
B01D 1/14      (2006.01)
B01D 3/36      (2006.01)

(52) U.S. Cl.
CPC .............. C07B 59/004 (2013.01); B01D 1/14 (2013.01); B01D 3/36 (2013.01); C07B 2200/05 (2013.01)

(58) Field of Classification Search
CPC ................................................... C07B 59/004
See application file for complete search history.

(56) References Cited

U.S. PATENT DOCUMENTS

2016/0326109 A1      11/2016   DiMagno et al.

FOREIGN PATENT DOCUMENTS

CN          101547933 A      9/2009
CN          106536490 A      3/2017
(Continued)

OTHER PUBLICATIONS

Nov. 14, 2024 Office Action issued in Chinese Patent Application No. 202180062460.5.

(Continued)

*Primary Examiner* — Benjamin J Packard
(74) *Attorney, Agent, or Firm* — Oliff PLC

(57)          ABSTRACT

A method for evaporatively concentrating a radioactive metal nuclide, including: a first evaporative concentration process in which a radioactive solution formed by dissolving a radioactive metal nuclide in an acidic aqueous solution is heated to evaporate a solvent in the radioactive solution so as to obtain a concentrated liquid containing the radioactive metal nuclide; and a second evaporative concentration process in which a low-boiling organic solvent having a lower boiling point than water is added to the concentrated liquid, and the concentrated liquid is heated to induce azeotropic boiling of the concentrated liquid and the low-boiling organic solvent so as to obtain an evaporative concentrate of the radioactive metal nuclide.

13 Claims, 4 Drawing Sheets

(56) References Cited

FOREIGN PATENT DOCUMENTS

| | | | |
|---|---|---|---|
| FR | 2 899 585 | A1 | 10/2007 |
| JP | 2009-084246 | A | 4/2009 |
| JP | 2010-505776 | A | 2/2010 |
| JP | 2017-502971 | A | 1/2017 |
| WO | 2008040441 | A2 | 4/2008 |

OTHER PUBLICATIONS

Matarrese, Mario et al.; "Automated Production of Copper Radio-isotopes and Preparation of High Specific Activity"; Cu-ATSM for PET Studies; Applied Radiation and Isotopes; 2010; vol. 68; No. 1; pp. 5-13.

Sep. 7, 2021 Written Opinion of the International Searching Authority issued in International Patent Application No. PCT/JP2021/025827.

Sep. 7, 2021 Search Report issued in International Patent Application No. PCT/JP2021/025827.

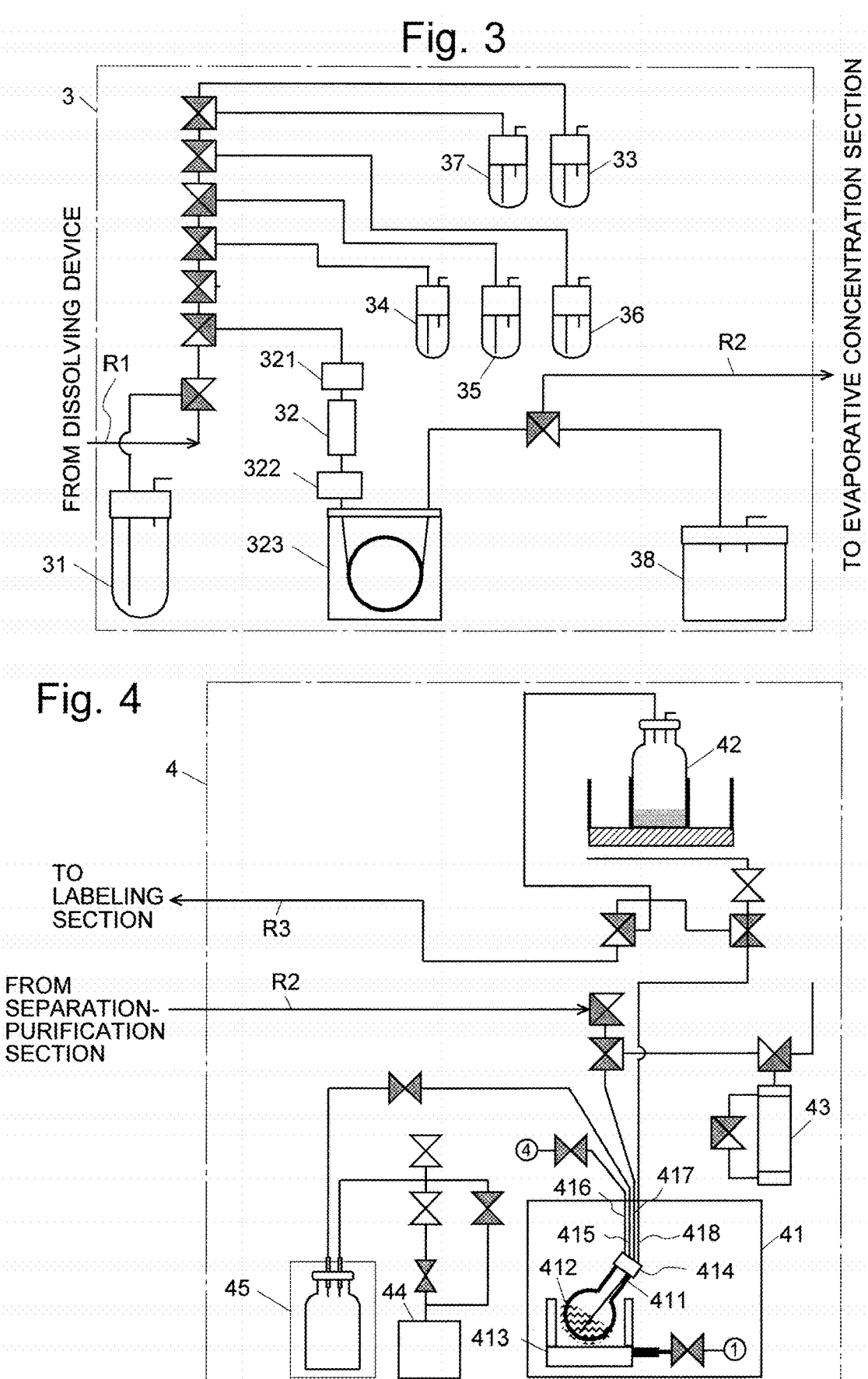

R3 FROM
EVAPORATIVE
CONCENTRATION
SECTION

| | | |
|---|---|---|
| 412 — HEATER | | FLOW SENSOR — 322 |
| 321 — TUBE PUMP | | TEMPERATURE SENSOR — 201 |
| 413 — ROTARY HOLDER | | RI SENSOR — 323 |
| 43 — SYRINGE PUMP | CONTROLLER | PRESSURE SENSOR — 202 |
| 44 — VACUUM PUMP | 200 | FLOW METER — 203 |
| 204 — SOLENOID VALVES | | |
| 205 — SOLENOID VALVES | | OPERATION UNIT — 206 |

METHOD FOR PRODUCING RADIOACTIVE LABELED SUBSTANCE, DEVICE FOR PRODUCING RADIOACTIVE LABELED SUBSTANCE, AND METHOD FOR EVAPORATIVELY CONCENTRATING RADIOACTIVE METAL NUCLIDE

TECHNICAL FIELD

The present invention relates to a method for producing a radioactive labeled substance formed by labeling a compound or the like with a radioactive metal nuclide, a device for producing a radioactive labeled substance, as well as a method for evaporatively concentrating a radioactive metal nuclide.

BACKGROUND ART

Beta radiation, which is a kind of radioactive ray, has the property of having a low level of substance penetrability and accordingly giving off a high amount of energy per unit length of penetration. Using this property of beta radiation, a radioactive therapeutic agent has been developed in which a radioactive metal nuclide that emits beta radiation is combined with a compound that has the property of gathering on the cells in the lesion area of a disease. Once internally administered, this radioactive therapeutic agent gathers on the lesion area and emits beta radiation at that area, whereby the cells in the lesion area are selectively destroyed, and the disease is thereby cured.

One of the radioactive metal nuclides that emit beta radiation is $^{64}Cu$. $^{64}Cu$ is expected to be used for cancer therapeutic drugs since it emits not only beta radiation but also a special type of electron (Auger electron) which can effectively damage the DNA of cancerous cells.

$^{64}Cu$ is produced by inducing the $^{64}Ni(p,n)^{64}Cu$ nuclear reaction by irradiating a target, such as metallic nickel (Ni) plated on a gold substrate, with a proton beam. The $^{64}Cu$ formed on the target is dissolved and collected by using an acid solution, such as hydrochloric acid or nitric acid. Since the collected solution contains not only $^{64}Cu$ but also Ni and other products, it is necessary to separate and purify $^{64}Cu$ from the other products.

The task of separating and purifying $^{64}Cu$ from a solution containing $^{64}Cu$, Ni and other substances is normally performed by the following method:

Initially, the dissolving liquid containing $^{64}Cu$, Ni and other substances is passed through a column packed with an anion-exchange resin to cause $^{64}Cu$ in the dissolving liquid to be adsorbed onto the anion-exchange resin. Subsequently, an acidic separator solution, such as hydrochloric acid, is passed through the column, whereby the $^{64}Cu$ adsorbed on the anion-exchange resin is desorbed from the same resin and collected along with the separator solution ($^{64}Cu$ separation process).

The separator solution containing $^{64}Cu$ is subsequently put into a flask. The flask is rotated and heated with a heater to evaporate the separator solution. The separator solution is thereby concentrated, and $^{64}Cu$ is precipitated ($^{64}Cu$ concentration process).

The $^{64}Cu$ obtained in the concentration process is dissolved in an appropriate dissolving liquid, and this liquid is subsequently mixed with a reaction liquid containing a label-target compound (therapeutic agent). Consequently, the $^{64}Cu$ combines with the label-target compound, and a radioactive therapeutic agent labeled with $^{64}Cu$ is obtained ($^{64}Cu$ labeling process).

CITATION LIST

Patent Literature

Patent Literature 1: JP 2009-84246 A

Technical Problem

Conventionally, the previously described series of tasks from the $^{64}Cu$ separation process to the $^{64}Cu$ labeling process are normally performed by manual operations. However, the manual operations inevitably cause radiation exposure of the operator. Accordingly, for some of those processes or some steps in any one of those processes, a device for automatically performing those process steps has been developed (Patent Literature 1).

However, the $^{64}Cu$ concentration process has been difficult to automatize for the following reason: For a radioactive metal nuclide, like $^{64}Cu$, the process steps in the $^{64}Cu$-separation and $^{64}Cu$ concentration processes are performed on the radioactive metal nuclide dissolved in an acidic solution, such as hydrochloride acid or nitric acid. When the separator solution obtained in the $^{64}Cu$ separation process is heated in the $^{64}Cu$ concentration process, the acidic solution contained in the separator solution cannot be sufficiently evaporated, so that a portion of the acidic solution remains within the flask. Consequently, the product collected in the $^{64}Cu$ concentration process is acidic.

Since the reaction between the $^{64}Cu$ contained in the collected product and the label-target compound must be performed under a neutral condition, the task of adding an appropriate dissolving liquid to the collected product to adjust its pH value is performed before the collected product is mixed with the reaction liquid containing the label-target compound. The pH value of the collected product depends on the amount of residue of the acidic solution contained in the collected product, while the amount of residue of the acidic solution varies due to various factors. Furthermore, since the amount of collected product is small, it is difficult to measure the pH value of the collected product. Thus, the operator must gradually add the dissolving liquid to the collected product while measuring the pH value from time to time.

The problem to be solved by the present invention is to make it possible to perform, without manual intervention, the processing from the separation of a radioactive metal nuclide from a radioactive solution formed by dissolving the radioactive metal nuclide in an acidic aqueous solution, to the production of a radioactive labeled substance by causing the radioactive metal nuclide to react with a label-target compound.

Solution to Problem

The first aspect of the present invention developed for solving the previously described problem is a method for evaporatively concentrating a radioactive metal nuclide, including:

a first evaporative concentration process in which a radioactive solution formed by dissolving at least a radioactive metal nuclide in an acidic aqueous solution is heated to evaporate a solvent in the radioactive solution so as to obtain a concentrated liquid containing the radioactive metal nuclide; and a second evaporative concentration process in which a low-boiling organic solvent having a lower boiling point than water is added to the concentrated liquid, and the concentrated liquid is heated to induce azeotropic boiling of the concentrated liquid and the low-boiling organic solvent so as to obtain an evaporative concentrate of the radioactive metal nuclide.

In the previously described method, when a radioactive solution is heated in the first evaporative concentration process, the water which is a solvent in the radioactive solution is mainly evaporated, and a concentrated liquid in which both the concentration of the dissolved radioactive metal nuclide and the acidic concentration are higher than in the radioactive solution is obtained. Subsequently, in the second evaporative concentration process, a low-boiling organic solvent is added to the concentrated liquid, and the mixture is heated, which induces azeotropic boiling of the concentrated liquid (or the concentrated acidic aqueous solution contained in this liquid) and the low-boiling organic solvent, whereby the low-boiling organic solvent and the acidic aqueous solution are evaporated, and an evaporative concentrate of the radioactive metal nuclide is obtained. Since the acidic aqueous solution contained in the concentrated liquid is evaporated, the evaporative concentrate is closer to neutrality than the concentrated liquid.

In the previously described method for evaporatively concentrating a radioactive metal nuclide, after the concentrated liquid is heated with the low-boiling organic solvent added in the second evaporative concentration process, a low-boiling organic solvent which is the same kind of solvent as, or a different kind of solvent from, the aforementioned low-boiling organic solvent may be once more added to the concentrated liquid, and the concentrated liquid may be heated to obtain the evaporative concentrate.

By this method, a larger amount of acidic aqueous solution can be removed from the evaporative concentrate.

Here, an acidic aqueous solution containing a kind of acid selected from a group of acids that can be evaporatively concentrated, such as hydrochloric acid, nitric acid or phosphoric acid, can be used as the acidic aqueous solution.

Solvents available as the low-boiling organic solvent include ethanol (boiling point: approximately 78.5 degrees Celsius), acetonitrile (boiling point: approximately 82 degrees Celsius), and acetone (boiling point: approximately 56 degrees Celsius).

The radioactive metal nuclide is a kind of metal nuclide selected from the group consisting of $^{61}Cu$, $^{62}Cu$, $^{64}Cu$, $^{66}Cu$, $^{67}Cu$, $^{28}Mg$, $^{43}Sc$ and $^{68}Ga$ all of which adsorb onto an ion-exchange resin and can also be eluted with an acidic eluent.

The second aspect of the present invention developed for solving the previously described problem is a method for producing a radioactive labeled substance formed by labeling a compound with a radioactive metal nuclide, including:

an adsorption process in which a radioactive dissolving liquid formed by dissolving a radioactive metal nuclide in an acidic dissolving liquid is passed through an ion-exchange resin to cause the radioactive metal nuclide to be adsorbed onto the ion-exchange resin;

an elution process in which an acidic eluent is passed through the ion-exchange resin and ultimately collected as a radioactive solution resulting from an ion exchange between the radioactive metal nuclide adsorbed on the ion-exchange resin and the eluent;

a first evaporative concentration process in which a radioactive solution collected in the elution process is heated to evaporate a solvent in the radioactive solution so as to obtain a concentrated liquid containing the radioactive metal nuclide;

a second evaporative concentration process in which a low-boiling organic solvent having a lower boiling point than water is added to the concentrated liquid, and the concentrated liquid is heated to induce azeotropic boiling of the concentrated liquid and the low-boiling organic solvent so as to obtain an evaporative concentrate of the radioactive metal nuclide; and a labeling process in which the radioactive metal nuclide contained in the evaporative concentrate is caused to react with a label-target compound so as to obtain a radioactive labeled substance.

The third aspect of the present invention developed for solving the previously described problem is a device for evaporatively concentrating a radioactive metal nuclide, including:

a concentration container;

a heater configured to heat the concentration container;

an organic solvent tank for holding a low-boiling organic solvent having a lower boiling point than water;

an introducing section configured to introduce the low-boiling organic solvent held in the organic solvent tank through an introduction passage into the concentration container;

a temperature sensor configured to detect the temperature of the concentration container; and a controller, where the controller is configured to sequentially perform:

a first evaporative concentration process in which, when a radioactive solution formed by dissolving a radioactive metal nuclide in an acidic aqueous solution is held in the concentration container, the controller drives the heater to heat the concentration container thereby evaporating a solvent contained in the radioactive solution so as to obtain a concentrated liquid containing the radioactive metal nuclide, and a second evaporative concentration process in which, after causing the introducing section to introduce the low-boiling organic solvent in the organic solvent tank into the concentration container, the controller drives the heater to heat the concentration container thereby inducing azeotropic boiling of the concentrated liquid and the low-boiling organic solvent so as to obtain an evaporative concentrate of the radioactive metal nuclide.

Furthermore, the fourth aspect of the present invention developed for solving the previously described problem is a device for producing a radioactive labeled substance, including:

a separation-collection section configured to separate a radioactive metal nuclide from a radioactive dissolving liquid which is an acidic dissolving liquid in which the radioactive metal nuclide and an impurity are dissolved, and to collect the radioactive dissolving liquid as a radioactive solution;

an evaporative concentration section configured to heat the radioactive solution collected by the separation-collection section, so as to evaporate a solvent in the radioactive solution and thereby evaporatively concentrate the radioactive metal nuclide; and a labeling section configured to produce a radioactive labeled substance by causing the evaporatively concentrated radioactive metal nuclide to react with a label-target compound, where the evaporative concentration section includes:

a concentration container;

a heater configured to heat the concentration container;

an organic solvent tank for holding a low-boiling organic solvent having a lower boiling point than water;

an introducing section configured to introduce the low-boiling organic solvent in the organic solvent tank through an introduction passage into the concentration container;

a temperature sensor configured to detect the temperature of the concentration container; and a controller, where the controller is configured to sequentially perform:

a first evaporative concentration process in which, when a radioactive solution formed by dissolving a radioactive metal nuclide in an acidic aqueous solution is held in the concentration container, the controller drives the heater to heat the concentration container thereby evaporating a solvent contained in the radioactive solution so as to obtain a concentrated liquid containing the radioactive metal nuclide, and a second evaporative concentration process in which, after causing the introducing section to introduce the low-boiling organic solvent in the organic solvent into the concentration container, the controller drives the heater to heat the concentration container thereby inducing azeotropic boiling of the concentrated liquid and the low-boiling organic solvent so as to obtain an evaporative concentrate of the radioactive metal nuclide.

Advantageous Effects of Invention

In the present invention, when a radioactive solution formed by dissolving a radioactive metal nuclide in an acidic aqueous solution is heated in the process of concentrating a radioactive metal nuclide, a low-boiling organic solvent is added to the radioactive solution, so that the acidic aqueous solution contained in the radioactive solution is removed by the azeotropic boiling with the low-boiling organic solvent. Therefore, the evaporative concentrate of the radioactive metal nuclide becomes neutral. Accordingly, unlike the conventional method, the process of neutralizing the evaporative concentrate before causing the radioactive metal nuclide to react with the label-target compound is unnecessary. Therefore, the operations from the collection of the radioactive metal nuclide from the radioactive solution formed by dissolving the radioactive metal nuclide in an acidic aqueous solution, such as hydrochloric acid, to the production of the radioactive labeled substance through the reaction of the radioactive metal nuclide with the label-target compound, can be performed without manual intervention.

BRIEF DESCRIPTION OF DRAWINGS

FIG. 1 is a diagram showing a schematic general configuration of a production system for a radioactive labeled substance, which is one embodiment of the present invention.

FIG. 2 is a diagram showing a general configuration of a dissolving device.

FIG. 3 is a diagram showing a general configuration of a separation-purification section.

FIG. 4 is a diagram showing a general configuration of an evaporative concentration section.

DESCRIPTION OF EMBODIMENTS

Figures 5, 6:
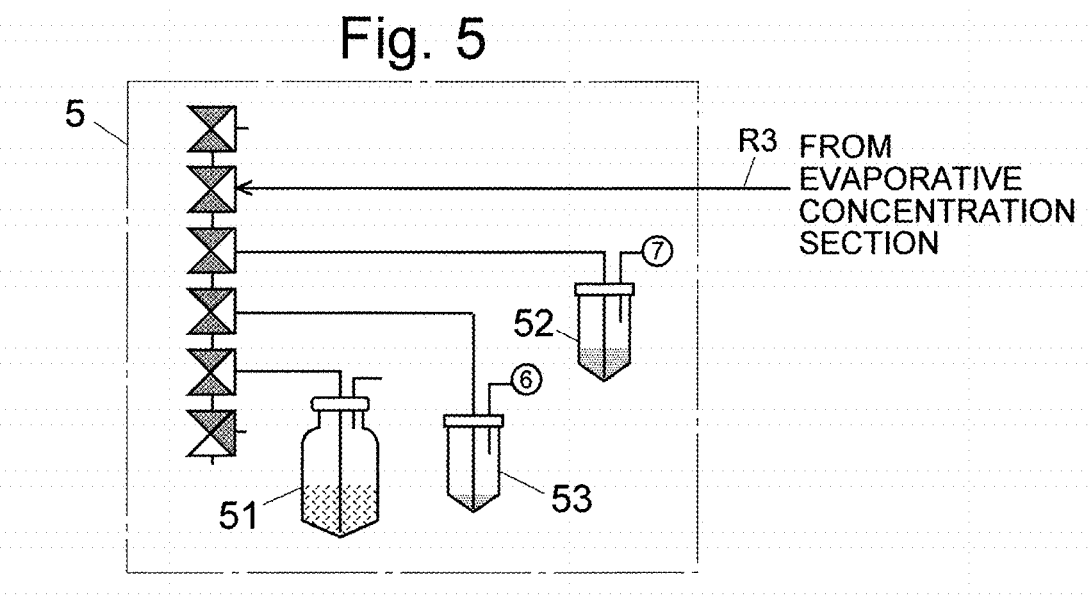
FIG. 5 is a diagram showing a general configuration of a labeling section.
FIG. 6 is a schematic block configuration diagram of the production system.

A mode for carrying out the present invention is hereinafter described with reference to the drawings.

Configuration of System According to Present Embodiment

Figures 1, 2:
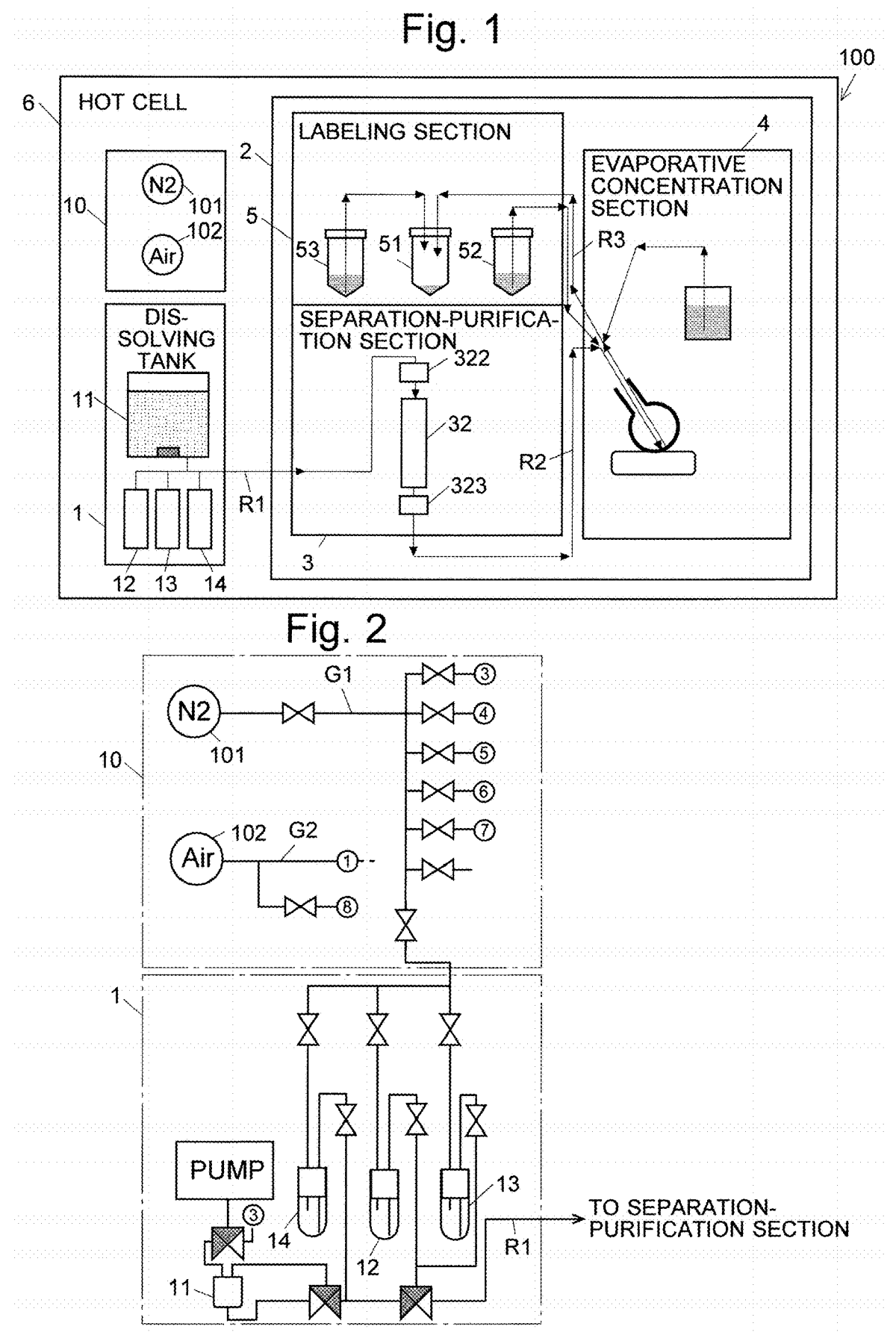

FIG. 1 shows a schematic general configuration of a production system 100 for a radioactive labeled substance. In the present description, a radioactive labeled substance formed by labeling a compound with $^{64}Cu$, which is a kind of radioactive metal nuclide, is taken as an example of the radioactive labeled substance.

The production system 100 includes a dissolving device 1, radioactive labeled substance production device 2, and gas supply device 10. The radioactive labeled substance production device 2 has a separation-purification section 3, evaporative concentration section 4, and labelling section 5. The dissolving device 1, radioactive labeled substance production device 2, and gas supply device 10 are integrally arranged within a hot cell 6.

FIG. 2 shows a schematic general configuration of the dissolving device 1 and the gas supply device 10. As shown in FIGS. 1 and 2, the dissolving device 1 and the gas supply device 10 are vertically arranged within the hot cell 6.

The dissolving device 1 has a dissolving tank 11, dissolving liquid tank 14, dilution water tank 12, and washing water tank 13. The dissolving tank 11 is a tank for producing a radioactive dissolving liquid by dissolving a nickel plating (gold plate) on which $^{64}Cu$ has been produced by irradiation with a proton beam. The dissolving liquid tank 14 holds an acidic dissolving liquid, such as a nitric acid solution or hydrochloric acid solution. In the following description, a solution containing a radioactive metal nuclide obtained in the dissolving device 1, i.e., a solution obtained by dissolving, into an acidic dissolving liquid, a piece of raw metal on which a radioactive metal nuclide has been formed, is called a "radioactive dissolving liquid". The radioactive dissolving liquid is a solution before the radioactive metal nuclide is separated therefrom in the separation-purification section, which will be described later.

The dilution water tank 12 holds dilution water which is to be added to the radioactive dissolving liquid prepared in the dissolving tank 11 so as to adjust the concentration of the radioactive dissolving liquid (nitric acid concentration or hydrochloric acid concentration). The washing water tank 13 holds washing water for flushing a passage R1 extending from the dissolving device 1 to the radioactive labeled substance production device 2 (evaporative concentration section 4).

The gas supply device 10 has a nitrogen gas supply 101 and an air supply 102. The nitrogen gas supply 101 supplies nitrogen gas, which is an inert gas, through a gas supply passage G1 to the related sections of the dissolving device 1 and the radioactive labeled substance production device 2.

The air supply 102 supplies air through a gas supply passage G2 to the related sections of the dissolving device 1 and the radioactive labeled substance production device 2. Valves are provided in the gas supply passages G1 and G2, allowing the destination of the nitrogen gas or air to be switched by an open/close operation of the valves.

FIG. 3 shows a schematic general configuration of the separation-purification section 3. The separation-purification section 3 corresponds to the separation-collection section in the present invention. As shown in this drawing, the separation-purification section 3 has a buffer tank 31, column 32, column-washing water tank 33, column-cleaning liquid tank 34, first eluent tank 35, second eluent tank 36, third eluent tank 37, and waste tank 38.

The column 32 is packed with an ion-exchange resin for separating $^{64}$Cu from Ni and other components. The passage R1 is connected to the inlet of the buffer tank 31. Through this passage, a radioactive dissolving liquid delivered from the dissolving device 1 is introduced into the buffer tank 31. The radioactive dissolving liquid introduced into the buffer tank 31 flows through a passage formed by a tube pump (peristaltic pump) 323, column 32 and other elements, to be received by the waste tank 38. Through this process, $^{64}$Cu as well as Ni and other components are adsorbed in the column 32. The ejection port of the tube pump 323 is connected to the evaporative concentration section 4 via the passage R2. A flow sensor 321 is provided in the passage R1 at a position near the inlet of the column 32. A radioactivity (RI) sensor 322 is provided between the column 32 and the tube pump 323.

The buffer tank 31 collects, via the passage R1, the washing water flown from the washing water tank 13 to wash the dissolving tank 11 and the passage R1.

The first eluent tank 35 holds an eluent for $^{64}$Cu elution. The eluent for $^{64}$Cu elution is an acidic aqueous solution. The second and third eluent tanks 36 and 37 hold eluents for Ni collection. The eluents held in the second and third eluent tanks 36 and 37 may be of the same kind or different kinds of eluents. In the following description, an eluate which contains $^{64}$Cu and is pushed out of the column 32 by a flow of the eluent for $^{64}$Cu elution through the column 32 is called a "radioactive solution". In other words, the solution containing a radioactive metal nuclide separated in the separation-purification section 3 is called a "radioactive solution" and distinguished from the radioactive dissolving liquid mentioned earlier. Additionally, in the following description, the acidic aqueous solution used for eluting the radioactive metal nuclide in the separation-purification section 3 is called the "acidic aqueous solution" and distinguished from the acidic dissolving liquid mentioned earlier.

The column-washing water tank 33 and the column-cleaning liquid tank 34 respectively hold the washing water and the cleaning liquid for washing and cleaning the ion-exchange resin in the column 32. The waste tank 38 is a tank for collecting the washing water and the cleaning liquid passed through the column 32, or an eluate containing Ni and other components.

FIG. 4 shows a schematic general configuration of the evaporative concentration section 4. As shown in this figure, the evaporative concentration section 4 has an evaporator unit 41, organic solvent tank 42, syringe pump 43, vacuum pump 44, and Dewar vessel 45. The organic solvent tank 42 holds an organic solvent having a lower boiling point than water (low-boiling organic solvent). The syringe pump 43 has a syringe (not shown) fitted therein and supplies the evaporator unit 41 with the low-boiling organic solvent contained in the syringe by operating the same syringe. The evaporator unit 41 includes a flask 411 serving as a concentration container, a heater 412 configured to heat the flask 411, and a rotary holder 413 configured to hold the flask 411. The flask 411 is either an eggplant flask or a round flask having a hemispherical bottom surface. The flask 411 held in the rotary holder 413 is rotated by the same rotary holder 413.

The mouth of the flask 411 is hermetically closed with a cover element 414. The cover element 414 has a pressure-reducing tube 415 for reducing the pressure within the flask 411 and a pressure-increasing tube 416 for increasing the pressure within the flask 411. The pressure-reducing tube 415 is connected to the vacuum pump 44 via the Dewar vessel 45, while the pressure-increasing tube 416 is connected to the nitrogen gas supply 101 (see FIG. 2) through a gas passage.

The cover element 414 additionally has an introduction tube 417 and a drawing tube 418. The introduction tube 417 is a tube for introducing, into the flask 411, the radioactive solution delivered from the separation-purification section 3 and the low-boiling organic solvent supplied from the syringe pump 43. The drawing tube 418 is a tube for drawing the content in the flask 411 into the labeling section 5. The introduction tube 417, the passage extending from the syringe pump 43 to the introduction tube 417, and the passage extending from the organic solvent tank 42 to the flask 411 correspond to the introduction passage in the present invention. The introduction passage, syringe pump 43, vacuum pump 44 and control section 200 constitute the introducing section.

FIG. 5 shows a schematic general configuration of the labeling section 5. The labeling section 5, which has a reaction liquid tank 51, dissolving liquid tank 52, and additive liquid tank 53, is located above the separation-purification section 3 within the hot cell 6. The reaction liquid tank 51 holds a reaction liquid containing a label-target compound. The dissolving liquid tank 52 holds an appropriate kind of dissolving liquid to be used for dissolving a radioactive metal nuclide. The additive liquid tank 53 holds an additive liquid necessary for the reaction between the radioactive metal nuclide and the compound.

In the present embodiment, a container whose bottom surface has a V-shaped section is used as each of the reaction liquid tank 51, dissolving liquid tank 52 and additive liquid tank 53. This is aimed at helping the entire amount of liquid be taken out from each tank, regardless of whether the amount of liquid contained in the tank is large or small.

Although no detailed description will be given, the dissolving device 1 as well as the separation-purification section 3, evaporative concentration section 4 and labeling section 5 in the radioactive labeled substance production device 2 have liquid passages for passing various kinds of liquids, such as the washing water or cleaning liquid, and gas passages for passing the nitrogen gas or air delivered through the gas passages G1 and G2, in addition to the passages R1-R3. Those liquid and gas passages are provided with valves so that the flow of liquids and gases can be changed by an open/close operation of the valves.

FIG. 6 is a schematic block configuration diagram of the production system 100. As shown in this figure, the production system 100 includes a control section 200. Connected to this control section 200 are the flow sensor 321, temperature sensor 201, RI sensor 322, pressure sensor 202, flow meter 203, heater 412, tube pump 323, rotary holder 413, syringe pump 43, vacuum pump 44, gas supply device 10 (nitrogen gas supply 101 and air supply 102), solenoid valves 204 for liquid passages, solenoid valves 205 for gas passages, and operation unit 206. The temperature sensor 201 detects the temperature of the flask 411. The pressure sensor 202 detects the pressure of the gas supplied from the gas supply device 10.

Based on the input signals from the flow sensor 321, temperature sensor 201, RI sensor 322, pressure sensor 202 and flow meter 203, the control section 200 controls the driving operation of the heater 412, tube pump 323, rotary holder 413, syringe pump 43, vacuum pump 44, solenoid valves 204 for liquid passages, and solenoid valves 205 for gas passages according to a program previously stored in the control section 200.

[Schematic Operation of Each Device in Production System According to Present Embodiment]

Figure 7:
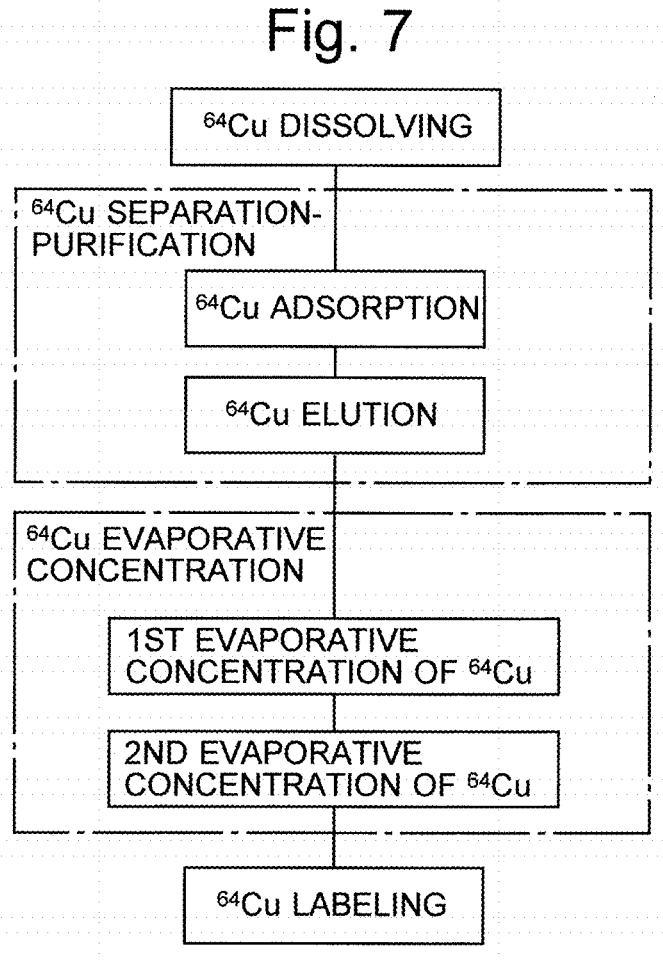
FIG. 7 is a diagram for explaining the flow of the operations in each section of the dissolving device and the radioactive labeled substance production device in the production system.

Next, an operation of each of the devices in the previously described production system 100, i.e., the dissolving device 1 and the radioactive labeled substance production device 2, is schematically described with reference to FIG. 7.

In the dissolving device 1, a process for dissolving a nickel plating (gold plate) on which $^{64}Cu$ has been produced by irradiation with a proton beam is performed. The $^{64}Cu$ dissolving process is initiated by placing the nickel plating (gold plate) with $^{64}Cu$ produced thereon, supplying a predetermined amount of nitrogen gas from the gas supply device 10 to the dissolving liquid tank 14, and pumping the acidic dissolving liquid in the dissolving liquid tank 14, such as the nitric acid solution or hydrochloric acid solution, to the dissolving tank 11. Consequently, $^{64}Cu$, Ni (including $^{64}Ni$) and other products are dissolved in the dissolving liquid, whereby a radioactive dissolving liquid is produced. The Ni (including $^{64}Ni$) and other products correspond to the impurity in the present invention.

After a predetermined period of time has elapsed since the dissolving liquid was pumped to the dissolving tank 11, the control section 200 controls the gas supply device 10 to supply a predetermined amount of nitrogen gas from the nitrogen gas supply 101 to the dissolving tank 11. The radioactive dissolving liquid in the dissolving tank 11 is thereby pumped through the passage R1 to the buffer tank 31 in the separation-purification section 3. As needed, the dilution water may also be pumped from the dilution water tank 12 to the dissolving tank 11 so as to regulate the acid concentration of the radioactive dissolving liquid before the radioactive dissolving liquid is pumped from the dissolving tank 11 to the separation-purification section 3.

In the separation-purification section 3, a process for separating and purifying $^{64}Cu$ from the radioactive dissolving liquid. The $^{64}Cu$ separation-purification process is initiated by introducing, into the column 32, the radioactive dissolving liquid in the buffer tank 31 delivered from the dissolving tank 11. When the separation-purification process is initiated, the control section 200 drives the tube pump 323. The radioactive dissolving liquid introduced into the column 32 is thereby passed through the ion-exchange resin. During this process, the $^{64}Cu$ and Ni which exist in the form of negative ions in the radioactive dissolving liquid are adsorbed onto the ion-exchange resin ($^{64}Cu$ adsorption process).

Next, the control section 200 controls the solenoid valves 204 and 205 to secure a passage from the column-washing water tank 33 through the column 32 to the waste tank 38, and energizes the tube pump 323 to draw the column-washing water from the column-washing water tank 33 and flush the column 32. The control section 200 subsequently secures a passage from the column-cleaning liquid tank 34 through the column 32 to the waste tank 38, and energizes the tube pump 323 to draw the column-cleaning liquid from the column-cleaning liquid tank 34 and remove impurities from the inside of the column 32. Furthermore, the control section 200 subsequently secures a passage from the first eluent tank 35 through the column 32 to the waste tank 38, and energizes the tube pump 323 to draw an eluent for $^{64}Cu$ elution, which is an acidic aqueous solution containing a nitric acid, hydrochloric acid or similar substance (this eluent is hereinafter called the "first eluent"), from the first eluent tank 35 into the column 32. It is hereinafter assumed that a hydrochloric acid solution with a pH of approximately 1 is used as the first eluent. By this operation, ion exchange occurs and $^{64}Cu$ is eluted ($^{64}Cu$ elution process). In this process, the beginning of the elution of the radioactive $^{64}Cu$ can be determined by monitoring the RI sensor 322 provided on the exit side of the column 32. When the measured value of the RI sensor 322 has exceeded the background level, the control section 200 controls the solenoid valve which switches to the passage R2 leading to the evaporative concentration section 4, whereby the radioactive solution containing $^{64}Cu$ is delivered to the evaporative concentration section 4. When the measured value of the RI sensor 322 has decreased to a level equal to or lower than the background level, the tube pump 323 is deenergized to discontinue the delivery of the liquid.

Next, the control section 200 controls the solenoid valves 204 and 205 to secure a passage from the second eluent tank 36 through the column 32 to the waste tank 38, and energizes the tube pump 323. The Ni within the column 32 is thereby eluted and collected in the waste tank 38. By passing the eluent for Ni collection through the column 32 in this manner, the Ni remaining on the ion-exchange resin can be almost completely removed. It should be noted that the number of times to introduce the eluent for Ni collection into the column 32 does not need to be two; it may be one, three or more times.

In the evaporative concentration section 4, the evaporative concentration process is performed in which the radioactive solution is heated to evaporate a solvent in the radioactive solution and thereby concentrate $^{64}Cu$. The evaporative concentration process is initiated by the introduction of the radioactive solution delivered from the separation-purification section 3 through the passage R2 into the flask 411 via the introduction tube 417. When the evaporative concentration process is initiated, the control section 200 drives the vacuum pump 44 to reduce the pressure within the flask 411. The same section 200 also heats the flask 411 from the heater 412 as well as rotates the rotary holder 413. The radioactive solution within the flask 411 is thereby heated while this flask 411 is being rotated, and the solvents (mainly, the first eluent) contained in the radioactive solution are evaporated. A portion of the evaporated solvent is turned into liquid (i.e., condensed) within the top portion of the flask 411 and flows back. Consequently, the $^{64}Cu$ in the radioactive solution is concentrated, and a concentrated liquid is obtained (first evaporative concentration process for $^{64}Cu$). In the first evaporative concentration process for $^{64}Cu$, both the water and the hydrochloric acid in the first eluent flow back in a similar manner. Therefore, the hydrochloric acid concentration of the concentrated liquid is almost equal to that of the radioactive solution, and the concentrated liquid is acidic.

Next, the control section 200 discontinues the rotation of the rotary holder 413 as well as discontinues the heating by the heater 412. When a predetermined period of time has elapsed (at the point in time where the temperature of the concentrated liquid becomes equal to or lower than a predetermined value), the vacuum pump 44 is driven to draw a predetermined amount of low-boiling organic solvent from the organic solvent tank 42 and add it to the concentrated liquid in the flask 411. Subsequently, the heating of the flask 411 by the heater 412 and the rotation of the rotary holder 413 are resumed. This operation induces azeotropic boiling of the concentrated liquid and the low-boiling organic solvent within the flask 411, whereby the first eluent contained in the concentrated liquid and the low-boiling organic solvent are evaporated. Consequently, $^{64}$Cu is left within the flask 411 along with a trace amount of hydrochloric acid solution and the low-boiling organic solvent which have not been evaporated.

Next, the syringe pump 43 is driven to add a predetermined amount of low-boiling organic solvent to the residue in the flask 411. Subsequently, the heating of the flask 411 by the heater 412 and the rotation of the rotary holder 413 are resumed. This operation induces azeotropic boiling of the first eluent contained in the residue and the low-boiling organic solvent, whereby the trace amount of eluent contained in the residue is almost entirely evaporated with the low-boiling organic solvent. When a predetermined period of time has elapsed since the beginning of the heating by the heater 412, the control section 200 deenergizes the heater 412. Consequently, an evaporative concentrate of $^{64}$Cu is formed within the flask 411 (second evaporative concentration process for $^{64}$Cu). The evaporative concentrate of $^{64}$Cu consists of either a dried solid of $^{64}$Cu or a mixture of the trace amount of first eluate and low-boiling organic solvent as well as $^{64}$Cu. Whichever of the dried solid and the mixture is obtained depends on the period of time and temperature of the heating by the heater 412 as well as other conditions. In any case, the evaporative concentrate falls within a neutral area since it contains no amount or only an insignificant amount of first eluent, i.e., the acidic aqueous solution.

Subsequently, the control section 200 controls the solenoid valves 204 and 205 to secure a passage from the dissolving liquid tank 52 in the labeling section 5 through the passage R3 to the flask 411, and drives the vacuum pump 44 to draw the entire amount of dissolving liquid held in the dissolving liquid tank 52 into the flask 411. The rotary holder 413 is subsequently rotated to stir the content of the flask 411. After the evaporative concentrate has been dissolved by the stirring, the rotary holder 413 and the vacuum pump 44 are stopped. Subsequently, the control section 200 controls the solenoid valves 204 and 205 to secure a passage from the flask 411 to the passage R3, and delivers the entire amount of dissolving liquid in the flask 11 through the passage R3 to the reaction liquid tank 51 in the labeling section 5.

In the labeling section 5, a $^{64}$Cu labeling process for obtaining a radioactive labeled substance by causing the $^{64}$Cu in the dissolving liquid to react with a label-target compound. The labeling process is initiated by the introduction of the dissolving liquid delivered from the evaporative concentration section 4 into the reaction liquid tank 51. When the labeling process is initiated, the control section 200 controls the gas supply device 10 to supply nitrogen gas from the nitrogen gas supply 101 to the additive liquid tank 53. The entire amount of additive liquid contained in the additive liquid tank 53 is thereby introduced into the reaction liquid tank 51. The reaction liquid, dissolving liquid and additive liquid contained in the reaction liquid tank 51, dissolving liquid tank 52 and additive liquid tank 53 are prepared beforehand in required quantities for the reaction between $^{64}$Cu and the label-target compound. Therefore, within the reaction liquid tank 51, the reaction between $^{64}$Cu and the label-target compound progresses with the liquids in exact quantities to produce a radioactive labeled substance.

Practical Example

Hereinafter described is a practical example in which $^{64}$Cu-ATSM [$^{64}$Cu-diacetyl-bis (N$^4$-methylthiosemicarbazone)] was produced as a radioactive labeled substance by using the production system 100 according to the previous embodiment. $^{64}$Cu-ATSM is a radioactive therapeutic agent developed for the treatment of malignant brain tumors.

Both the dissolving device 1 and the hot cell 6 used in the practical example were products of Sumitomo Heavy Industries, Ltd. As for the ion-exchange resin used for filling the column 32, a cation resin (AG 50W-X8 100-200 H+, manufactured by Bio-Rad Laboratories, Inc.) was used. The dissolving device 1 was connected to the radioactive labeled substance production device 2 as well as the gas supply device 10 via passages. A single control system was provided to control the dissolving device 1, radioactive labeled substance production device 2 and gas supply device 10 as well as the valves in the passages in a unified fashion so as to automatically perform the entire process from the $^{64}$Cu dissolving process, through the $^{64}$Cu separation-purification process and the $^{64}$Cu evaporative concentration process, to the $^{64}$Cu labeling process.

Before the production of $^{64}$Cu-ATSM, a target gold plate coated with $^{64}$Ni plating was irradiated with a proton beam generated by a cyclotron (HM-12S, manufactured by Sumitomo Heavy Industries, Ltd.) to produce $^{64}$Cu through the [$^{64}$Ni(p,n)$^{64}$Cu] nuclear reaction.

The types and amounts of the liquids used in each process were as shown in the following Table 1.

TABLE 1

| Device Name | | Solution Name | Composition | Volume | Code |
|---|---|---|---|---|---|
| Dissolving device | | Dissolving liquid | 6N nitric acid | 5 mL | 11 |
| | | Dilution water | Ultrapure water | 10 mL | 12 |
| | | Washing water | Ultrapure water | 10 mL | 13 |
| Radioactive labeled substance production device | Separation section | Column-washing water | Ultrapure water | 10 mL | 34 |
| | | Column-cleaning water | 0.5M HCl/Acetone (2:8) | 10 mL | 33 |
| | | Eluent A | 2M HCl/Acetone (1:9) | 80 mL | 35 |
| | | Eluent B | 5M HCl/Acetone (1:9) | 80 mL | 36 |
| | | Eluent C | 2M HCl | 50 mL | 37 |
| | Concentration section | Low-boiling organic solvent A | Ethanol | 10 mL | 42 |
| | | Low-boiling | Ethanol | 10 mL | 43 |

13      14

TABLE 1-continued

| Device Name | Solution Name | Composition | Volume | Code |
|---|---|---|---|---|
| Labeling section | organic solvent B Dissolving liquid | 0.125 mol/L glycine solution | 8 mL | 52 |
| | Reaction solution | 0.5 mmol/ATSM in DMSO | 200 μL | 51 |
| | Additive solution | 0.56 w/v % sodium ascorbate solution | 8 mL | 53 |

In the present example, a $^{64}$Cu-ATSM production test was performed three times. The results were as shown in Table 2.

TABLE 2

| Test Item | Test Method | Evaluation Criterion | Test 1 | Test 2 | Test 3 |
|---|---|---|---|---|---|
| Properties and appearance | Visual Observation | Transparent liquid | Pass | Pass | Pass |
| Identification test — Cu-64 | Measurement with Ge semiconductor detectors, Gamma ray measurement, General tests, The Minimum Requirements for Radiopharmaceuticals | Peaks observed at 511 keV and 1346 keV | Pass | Pass | Pass |
| $^{64}$Cu-ATSM | TLC, General tests, The Minimum Requirements for Radiopharmaceuticals | Discrepancy in $R_f$ value between standard solution of Cu-ATSM and main peak of radioactivity should be ±10% | Pass | Pass | Pass |
| pH | pH determination, The Minimum Requirements for Radiopharmaceuticals | 5.0-7.5 | Pass (6.287) | Pass (6.711) | Pass (6.819) |
| Purity test — Radiochemical impurities | TLC, General tests, The Minimum Requirements for Radiopharmaceuticals | 10% or less | Pass (2.82%) | Pass (4.87%) | Pass (5.04%) |
| Heterogenous nuclide | Measurement with Ge semiconductor detectors, Gamma ray measurement, General tests, The Minimum Requirements for Radiopharmaceuticals | Peaks barely observed except for 511, 1022 and 1346 keV | Pass | Pass | Pass |
| Endotoxins | Endotoxins test, General tests, The Japanese Pharmacopoeia | less than 150 EU/ total quantity | Pass | Pass | Pass |
| Insoluble impurities | Visual observation | No impurity recognized | Pass | Pass | Pass |
| Actual volume | Mass measurement of filled volume | | 14.85 mL | 14.56 mL | 15.01 mL |
| Quantification (radioactivity) — Cu-64 | Measurement with Ge semiconductor detectors, Gamma ray measurement, General tests, The Minimum Requirements for Radiopharmaceuticals | | 11.62 GBq | 13.6 GBq | 13.04 GBq |

As shown in Table 2, a therapeutic dose of $^{64}$Cu-ATSM conforming to the related quality standards was produced in all three tests.

In the present example, the volume of the radioactive solution introduced from the separation-purification section 3 into the flask 41 in the evaporative concentration process was 60 mL. By heating this radioactive solution with the evaporator unit 41, an intended evaporative concentrate was successfully obtained after 30 minutes from the beginning of the evaporative concentration process.

Meanwhile, as a comparison test, 10 mL of the collected eluate was put in a flask, and an evaporative concentration treatment of the radioactive solution was performed by a conventional method in which the flask was heated to 120° C. with a block heater. Despite the small quantity of liquid, the treatment required 30 minutes until the evaporative concentrate was obtained. This demonstrated that the test according to the present example using the evaporator unit 41 could reduce the concentrating-and-drying time per unit volume of liquid to one sixth the time as compared to the comparison test.

Apart from the three aforementioned tests, a concentration treatment using the evaporator unit 41 was performed on 60 mL of a radioactive solution (this treatment corresponds to the first evaporative concentration process in the present invention). The concentrated liquid within the flask 411 had a pH of 1 and was highly acidic. Accordingly, a treatment was performed which included the steps of adding 10 mL of ethanol to the concentrated liquid and heating the same liquid, followed by the steps of once more adding ethanol and heating the same liquid (this treatment corresponds to the second evaporative concentration process in the present invention). Consequently, the pH of the evaporative concentrate within the flask 411 increased to 6.5, which was almost neutral. This treatment required 4 minutes.

When the treatment including the steps of adding 10 mL of ethanol to the concentrated liquid and heating the same liquid was performed only one time, the treatment was completed in two minutes. However, the obtained evaporative concentrate had a pH of 3 and was still acidic.

The amount of residual ethanol in each $^{64}$Cu-ATSM product obtained in the three tests in the present example was measured with a gas chromatograph (manufactured by Shimadzu Corporation), which did not exceed the reference value (5000 ppm).

The previously described results demonstrate that the method according to the present invention in which ethanol (low-boiling organic solvent) is added to the concentrated liquid in the process of evaporatively concentrating $^{64}$Cu can reduce the period of time required for obtaining an evaporative concentrate to roughly one third or one half as compared to the conventional method. Furthermore, an evaporative concentrate which falls within a neutral area is obtained in the $^{64}$Cu evaporative concentration process. These facts indicate that this evaporative concentrate can be directly transferred to the $^{64}$Cu labeling process without manual intervention by the operator.

Accordingly, the entire processing from the $^{64}$Cu dissolving process to the $^{64}$Cu labeling process for the production of a radioactive labeled substance can be automatized by using the evaporative concentration method according to the present invention. Furthermore, the automatization of the entire processing can dramatically reduce the radiation exposure of the operator (an experiment by the present inventors showed that the exposure could be reduced to roughly one fifth the amount). It also allows for a stable, mass production of radioactive labeled substances, such as radiopharmaceuticals.

In the previously described example, the treatment of adding a low-boiling organic solvent to the content of the flask 411 and inducing the azeotropic boiling of the solvent and the first eluent was performed two times so that the evaporative concentrate to be obtained in the second evaporative concentration process for $^{64}$Cu would assuredly fall within a neutral area. In some cases, the azeotropic boiling treatment may only need to be performed one time. For example, under appropriately set conditions, such as a larger amount of low-boiling organic solvent to be added to the concentrated liquid in the flask 411 or a longer heating time with the heater 412, it may be possible to almost entirely evaporate the first eluate contained in the concentrated liquid and obtain an evaporative concentrate falling within a neutral area by a single execution of the azeotropic boiling treatment.

Although $^{64}$Cu was used as the radioactive metal nuclide, the evaporative concentration method according to the present invention can be applied to any radioactive metal nuclide, provided that the processing for producing a radioactive labeled substance can be performed on the radioactive metal nuclide dissolved in an acidic aqueous solution, and that the radioactive metal nuclide can be adsorbed onto an ion-exchange resin. This type of radioactive metal nuclide includes $^{61}$Cu, $^{62}$Cu, $^{64}$Cu, $^{66}$Cu, $^{67}$Cu, $^{28}$Mg, $^{43}$Sc and $^{68}$Ga.

The acidic aqueous solution in which a radioactive metal nuclide should be dissolved is selected according to the kind of radioactive metal nuclide. Examples include hydrochloric acid, nitric acid and phosphoric acid.

Although ethanol was used as the low-boiling organic solvent in the previously described example, the low-boiling organic solvent is not limited to this example. Any solvent having a lower boiling point than water can be used, such as acetonitrile or acetone. The solvent to be used as the low-boiling organic solvent may be a single kind of organic solvent or a mixed solvent composed of a plurality of kinds of organic solvents.

REFERENCE SIGNS LIST

100 . . . Production System
1 . . . Dissolving Device
10 . . . Gas Supply Device
101 . . . Nitrogen Gas Supply
102 . . . Air Supply
11 . . . Dissolving Tank
12 . . . Dilution Water Tank
13 . . . Washing Water Tank
14 . . . Dissolving Liquid Tank
2 . . . Radioactive Labeled Substance Production Device
3 . . . Separation-Purification Section
31 . . . Buffer Tank
32 . . . Column
321 . . . Flow Sensor
322 . . . RI Sensor
323 . . . Tube Pump
33 . . . Column-Washing Water Tank
34 . . . Column-Cleaning Liquid Tank
35 . . . First Eluent Tank
36 . . . Second Eluent Tank
37 . . . Third Eluent Tank
38 . . . Waste Tank
4 . . . Evaporative Concentration Section
41 . . . Evaporator Unit
411 . . . Flask
412 . . . Heater
413 . . . Rotary Holder
414 . . . Cover Element
415 . . . Pressure-Reducing Tube
416 . . . Pressure-Increasing Tube
417 . . . Introduction Tube
418 . . . Drawing Tube
42 . . . Organic Solvent Tank
43 . . . Syringe Pump
44 . . . Vacuum Pump

45 . . . Dewar Vessel

5 . . . Labeling Section

51 . . . Reaction Liquid Tank

52 . . . Dissolving Liquid Tank

53 . . . Additive Liquid Tank

6 . . . Hot Cell

The invention claimed is:

1. A method for evaporatively concentrating a radioactive metal nuclide, comprising:

a first evaporative concentration process in which a radioactive solution formed by dissolving at least a radioactive metal nuclide in an acidic aqueous solution is heated to evaporate a solvent in the radioactive solution so as to obtain a concentrated liquid containing the radioactive metal nuclide; and a second evaporative concentration process in which a low-boiling organic solvent having a lower boiling point than water is added to the concentrated liquid, and the concentrated liquid is heated to induce azeotropic boiling of the concentrated liquid and the low-boiling organic solvent so as to obtain an evaporative concentrate of the radioactive metal nuclide, wherein, in the second evaporative concentration process, the azeotropic boiling of the concentrated liquid and the low-boiling organic solvent is induced so that a pH of the evaporative concentrate of the radioactive metal nuclide is substantially neutral.

2. The method for evaporatively concentrating a radioactive metal nuclide according to claim 1, wherein, after the concentrated liquid is heated with the low-boiling organic solvent added in the second evaporative concentration process, a low-boiling organic solvent which is a same kind of solvent as, or a different kind of solvent from, the aforementioned low-boiling organic solvent is once more added to the concentrated liquid, and the concentrated liquid is heated to obtain the evaporative concentrate.

3. The method for evaporatively concentrating a radioactive metal nuclide according to claim 1, wherein the acidic aqueous solution contains one kind of solution selected from a group consisting of hydrochloric acid, nitric acid and phosphoric acid.

4. The method for evaporatively concentrating a radioactive metal nuclide according to claim 1, wherein the low-boiling organic solvent is one kind of solvent, or a mixed solvent of a plurality of kinds of solvents, selected from a group consisting of ethanol, acetonitrile and acetone.

5. The method for evaporatively concentrating a radioactive metal nuclide according to claim 1, wherein the radioactive metal nuclide is a kind of metal nuclide selected from a group consisting of $^{61}Cu$, $^{62}Cu$, $^{64}Cu$, $^{66}Cu$, $^{67}Cu$, $^{28}Mg$, $^{43}Sc$ and $^{68}Ga$ all of which adsorb onto an ion-exchange resin and can be eluted with an acidic eluent.

6. A method for producing a radioactive labeled substance formed by labeling a compound with a radioactive metal nuclide, comprising:

an adsorption process in which a radioactive dissolving liquid formed by dissolving a radioactive metal nuclide in an acidic dissolving liquid is passed through an ion-exchange resin to cause the radioactive metal nuclide to be adsorbed onto the ion-exchange resin;

an elution process in which an acidic eluent is passed through the ion-exchange resin and ultimately collected as a radioactive solution resulting from an ion exchange between the radioactive metal nuclide adsorbed on the ion-exchange resin and the eluent;

a first evaporative concentration process in which a radioactive solution collected in the elution process is heated to evaporate a solvent in the radioactive solution so as to obtain a concentrated liquid containing the radioactive metal nuclide;

a second evaporative concentration process in which a low-boiling organic solvent having a lower boiling point than water is added to the concentrated liquid, and the concentrated liquid is heated to induce azeotropic boiling of the concentrated liquid and the low-boiling organic solvent so as to obtain an evaporative concentrate of the radioactive metal nuclide, wherein, in the second evaporative concentration process, the azeotropic boiling of the concentrated liquid and the low-boiling organic solvent is induced so that a pH of the evaporative concentrate of the radioactive metal nuclide is substantially neutral; and a labeling process in which the radioactive metal nuclide contained in the evaporative concentrate is caused to react with a label-target compound so as to obtain a radioactive labeled substance.

7. A device comprising an evaporative concentration section, the evaporative concentration section including:

a concentration container;

a heater configured to heat the concentration container;

an organic solvent tank for holding a low-boiling organic solvent having a lower boiling point than water;

an introducing section configured to introduce the low-boiling organic solvent held in the organic solvent tank through an introduction passage into the concentration container;

a temperature sensor configured to detect a temperature of the concentration container; and a controller, wherein the controller is configured to sequentially perform:

a first evaporative concentration process in which, when a radioactive solution formed by dissolving a radioactive metal nuclide in an acidic aqueous solution is held in the concentration container, the controller drives the heater to heat the concentration container thereby evaporating a solvent contained in the radioactive solution so as to obtain a concentrated liquid containing the radioactive metal nuclide, and a second evaporative concentration process in which, after causing the introducing section to introduce the low-boiling organic solvent in the organic solvent tank into the concentration container, the controller drives the heater to heat the concentration container thereby inducing azeotropic boiling of the concentrated liquid and the low-boiling organic solvent so as to obtain an evaporative concentrate of the radioactive metal nuclide, wherein, in the second evaporative concentration process, the azeotropic boiling of the concentrated liquid and the low-boiling organic solvent is induced so that a pH of the evaporative concentrate of the radioactive metal nuclide is substantially neutral.

8. The device according to claim 7, further comprising:

a separation-collection section configured to separate a radioactive metal nuclide from a radioactive dissolving liquid which is an acidic dissolving liquid in which the radioactive metal nuclide and an impurity are dissolved, and to collect the radioactive dissolving liquid as a radioactive solution; and a labeling section configured to produce a radioactive labeled substance by causing the evaporative concentrate of the radioactive metal nuclide obtained by the evaporative concentration section to react with a label-target compound, wherein the controller is configured to perform:

the first evaporative concentration process, when the radioactive solution collected by the separation-collection section is held in the concentration container.

9. The device according to claim 8, wherein the labeling section includes a reaction liquid tank having a bottom surface with a V-shaped section.

10. The method for evaporatively concentrating a radioactive metal nuclide according to claim 2, wherein the acidic aqueous solution contains one kind of solution selected from a group consisting of hydrochloric acid, nitric acid and phosphoric acid.

11. The method for evaporatively concentrating a radioactive metal nuclide according to claim 2, wherein the low-boiling organic solvent is one kind of solvent, or a mixed solvent of a plurality of kinds of solvents, selected from a group consisting of ethanol, acetonitrile and acetone.

12. The method for evaporatively concentrating a radioactive metal nuclide according to claim 3, wherein the low-boiling organic solvent is one kind of solvent, or a mixed solvent of a plurality of kinds of solvents, selected from a group consisting of ethanol, acetonitrile and acetone.

13. The method for evaporatively concentrating a radioactive metal nuclide according to claim 10, wherein the low-boiling organic solvent is one kind of solvent, or a mixed solvent of a plurality of kinds of solvents, selected from a group consisting of ethanol, acetonitrile and acetone.

\* \* \* \* \*